Aug. 7, 1928.
J. B. WIARD
1,679,457
DYNAMO ELECTRIC MACHINE
Filed Aug. 3, 1927
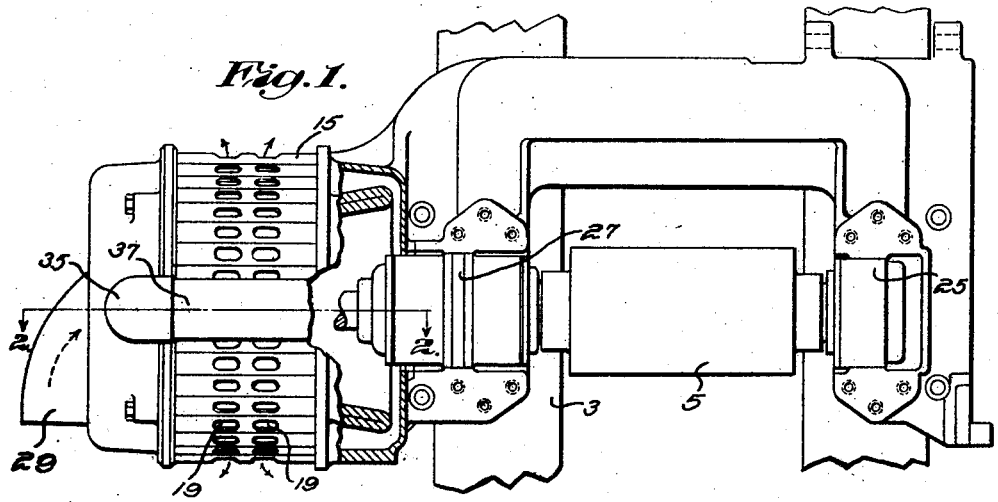
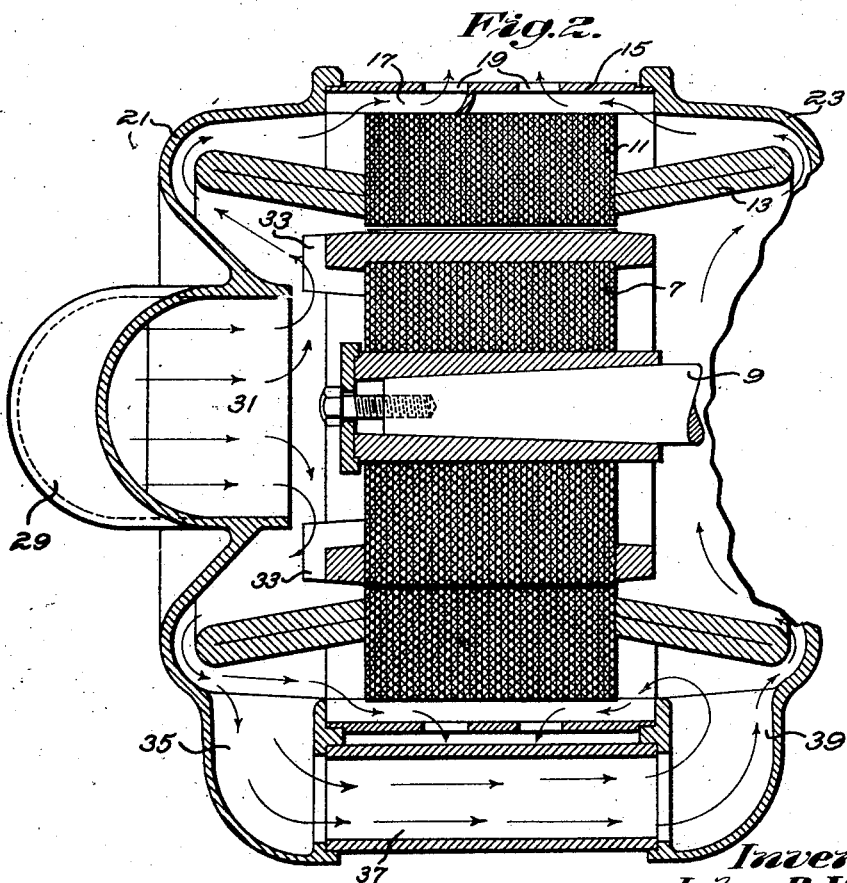
Inventor:
John B. Wiard,
by Emery Booth Janney Varney
Attys.

Patented Aug. 7, 1928.

1,679,457

UNITED STATES PATENT OFFICE.

JOHN B. WIARD, OF LYNN, MASSACHUSETTS, ASSIGNOR TO H. C. DODGE, INCORPORATED, OF SOUTH BOSTON, MASSACHUSETTS, A CORPORATION OF MASSACHUSETTS.

DYNAMO-ELECTRIC MACHINE.

Application filed August 3, 1927. Serial No. 210,291.

This invention relates to dynamo electric machines and more particularly to improvements designed to dissipate the heat arising from internal losses in such machines.

The invention has for its object the provision of an effective cooling or ventilating system embodied in the machine itself in simple, compact form, particularly, though not exclusively, intended for high speed, direct-connected, induction motors where the constructional features render the ordinary methods of cooling impracticable.

The invention will be best understood by reference to the following description when taken in connection with the accompanying illustration showing one specific embodiment thereof, while its scope will be more particularly pointed out in the appended claims.

In the drawings:

Fig. 1 is a front elevation, in partial section, showing a motor embodying one form of the invention and its relationship to a machine with which it is associated; and Fig. 2 is an enlarged, sectional plan taken through the motor illustrated in Fig. 1.

Referring to the drawings, I have there shown for illustrative purposes one embodiment of the invention in an alternating current motor of the induction type which is mounted on the frame 3 of a wood-working machine directly connected to drive a working part thereof, such as the cutter head 5. The machine 3 and cutter head 5 are illustrative only of one of the many uses to which such a motor may be put, the particular part driven by the motor, and the particular purpose of the machine to which it is applied, being immaterial.

The motor is herein provided with the rotor 7 having the shaft 9 coupled to or integral with the cutter head 5, and has also the stator core 11 and stator windings 13, the stator being built up from the usual laminated metallic sheets and held along their peripheral edges by the external sheet metal casing 15. The latter may be constructed substantially as described in my prior Patent No. 1,360,483, dated November 30, 1920, being longitudinally corrugated to provide longitudinal air circulation passages 17 distributed circumferentially around the stator and adapted to bring cooling air in contact with the peripheral edges of the stator core. Such longitudinal passages are provided each with openings 19 intermediate the ends of the stator, which herein constitute discharge openings for the cooling air which is caused to circulate about the motor parts, there being one set of such openings for the air entering one end of the longitudinal passages and another set for the air entering the opposite end.

The stator core and rotor are enclosed within a stator frame or housing formed by the corrugated sheet metal casing 15, already referred to, and opposite end housings in the form of castings 21 and 23, the casting 23 being bolted to the frame 3 of the woodworking machine, and in the illustrative embodiment of the invention providing the sole support for the stator. The rotor shaft and cutter head 5 are provided with bearings 25 and 27, the arrangement being such that the stator overhangs the machine frame in close proximity thereto and the rotor 7 overhangs its bearing 27.

In direct-connected motors employed under conditions similar to those pertaining to the motor herein illustrated, it is desirable that an efficient system of cooling or ventilation be employed in compact form so that fan blades or other air circulation devices may be employed self-contained within the stator housing itself. Motors used for these purposes are often of substantial size, and for such motors the most effective cooling of the heated parts is had by what is sometimes termed "symmetrical" ventilation or where the opposite sides of the stator core are subjected to the cooling effect of separate currents of cooling air in place of preheated air which has already been circulated over other heated parts of the motor and which is incidental to what is sometimes termed "through" or "one way" ventilation. In motors having such a relation to the driving member and the machine frame as is illustrated in the drawings, owing to the space ordinarily required for the bearing 27, to the utilization of the end casting 23 for the motor support and to the close relationship which, for constructional reasons, the overhung motor must bear to the machine frame on which it is supported, difficulties are experienced in availing of the inner or bearing end of the stator for the admission of cooling air in connection with self-contained, rotor-mounted, fan blades where the air must be drawn centrally within the path of the blades in order to render them reasonably effective. These difficulties are increased by the fact that in the case of a high speed motor supported in any such manner as illustrated the rotor is of relatively small diameter as compared with the size of the adjacent bearing required, so that the fan blades must rotate in a path of relatively small diameter and opportunity is lacking to direct the air centrally in proper relation to such blades.

In the illustrated form of the invention, advantage is taken of the overhanging relation of the motor and the unobstructed character of the outer end casting 21 to provide therein a main air receiving chamber with a large, ample, central air opening having a deflector or shield adapted to deliver air centrally within the orbital path of the rotor-mounted fan blades by which the cooling air is caused to circulate in two streams to opposite sides of the stator, one directly between the main air chamber and the air openings 19 and the other also between the main air chamber and the air openings 19 but indirectly through a suitable by-pass leading to the interior of the casting 23, thereby providing in compact and self-contained form what is substantially a symmetrical air cooling system.

In the illustrative embodiment of the invention circulation is arranged to take place from the main air chamber and its air opening to the air openings 19 formed in the corrugated casing 15, there being provided an air admission passage 29 of ample size which opens centrally through the mouth of a re-entrant shield or deflector 31 into the unobstructed space of the outer casting 21. The mouth of the deflector is carried close to the path of the fan blades 33 mounted on the end of the rotor, and is of such diameter that the air passing therethrough is delivered within the path of the fan blades so that the latter are most effective for forcing it radially outward. This fan accordingly maintains a current of cooling air which is distributed from the main air chamber in the casting 21 in two streams. One stream spreads radially outward to the outside of the adjoining end of the stator core, passing about the stator windings 13, then impinging against the end of the stator core and passing into the longitudinal passages 17, whence it emerges through the nearest set of discharge openings 19. To provide, however, for the circulation of cool air about the opposite end of the stator, a portion of the air in the main air chamber, constituting the second stream referred to, is diverted to one or more large size pockets or recesses 35 formed in the casting 21, whence it passes through a by-pass pipe 37 arranged externally the stator housing into a similar pocket or recess 39 in the end casting 23 and thereby enters the opposite end of the stator housing, whence it is distributed radially about the ends of the stator windings and stator parts, entering the opposite ends of the passages 17 and emerging through the second set of discharge openings 19. While one by-pass pipe 37 only is shown, a number of such pipes distributed circumferentially around the motor casing may be employed. The cooling air diverted to the by-pass pipe 37 has its temperature only slightly raised by contact with the ends of the stator windings adjacent the recess 35.

The passages 17 are herein shown as provided each with a deflector 41 which closes the passage between the openings 19 and deflects the air coming from the housing 21 outwardly through the nearer opening 19 so that it may not impinge against and impede the discharge of the air entering the passage from the opposite end. Such deflectors, however, may be dispensed with if desired, utilizing the same through unobstructed passage 17 for the opposite air currents, or entirely separate discharge passages for the opposite currents of air may be provided through or about the stator core.

The cooling air for the inner or bearing side of the motor is thus diverted from the stream of cooling air for the outer side of the motor before it has any substantial contact with the heated parts of the stator and while it is still cool and capable of efficiently dissipating the heat arising from the stator parts. Since the cooling air is forced under pressure through the by-pass into the casting 23 adjacent the bearing end of the rotor, a leakage of oil from the bearing into the motor housing is opposed by the air pressure in the housing instead of being assisted, as in the case where air is drawn by suction into that part of the housing surrounding the bearings. By causing all the cooling air, comprising both branches of the air current, to pass through the outer unobstructed casting of the motor housing and preferably centrally therethrough, a simple but efficient cooling system is provided and advantage is taken of the features of construction of motors used under conditions similar to those pertaining in the case of the illustrative embodiment of the invention, which features of construction, due to the space occupied by bearings and the close overhanging relationship of the motor to the machine frame, prevent the effective cooling of the motor parts in the usual manner where air is admitted directly to both ends of the motor.

While I have herein shown and described for the purpose of illustration one specific embodiment of the invention, it is to be understood that extensive deviations may be made therefrom without departing from the spirit thereof.

Claims:

1. A dynamo electric machine having a rotor and a stator, the latter including a stator core and a stator housing, including end housings forming air chambers at opposite ends of the stator and the rotor, the machine being supported in overhanging relation by the housing at one end only, a rotor shaft having a bearing at the supported end only of the machine, the machine having longitudinal air discharge passages circumferentially distributed about the stator between the end air chambers but communicating therewith, an air circulation device comprising fan blades mounted on the end of the rotor opposite the supported end thereof, the adjacent housing having an air admission opening, an air deflector arranged centrally with relation to the fan blades for directing the air admitted through said opening to within the path of the fan blades, and a by-pass arranged externally the stator and connecting the end air chambers, whereby cooling air is caused to enter at one end of the stator housing and pass in part directly therethrough to said discharge passages and in part to the opposite end of the stator housing through said by-pass and thence to said discharge passages.

2. A dynamo electric machine having a rotor and a stator, the latter including a stator core and a stator housing, including end housings forming air chambers at opposite ends of the stator and the rotor, the machine being supported by the housing at one end, a rotor shaft having a bearing at the supported end only of the machine, the machine having air discharge passages circumferentially distributed about the stator between the end air chambers but communicating therewith, an air circulation device comprising fan blades driven by one end of the rotor opposite the supported end thereof, the adjacent housing having an air admission opening, an air deflector for directing the air admitted through said opening to within the path of the fan blades, and a by-pass arranged externally the stator and connecting the end air chambers, whereby cooling air is caused to enter at one end of the stator housing and pass in part directly therethrough to said discharge passages and in part to the opposite end of the stator housing through said by-pass and thence to said discharge passages.

3. A dynamo electric machine having a rotor and a stator, the latter comprising a stator core and a stator housing, including end housings forming air chambers at opposite ends of the stator and rotor, the machine being supported by the housing at one end and having air discharge passages circumferentially distributed about the stator between the end air chambers but communicating therewith, an air circulation device comprising fan blades driven by the end of the rotor opposite the supported end of the machine, the adjacent housing having an air admission opening, an air deflector for directing the air admitted through said opening to within the path of the fan blades, and a by-pass arranged externally the stator and connecting the end air chambers, whereby cooling air is caused to enter at one end of the stator housing and pass in part directly therethrough to said discharge passages and in part to the opposite end of the stator housing through said by-pass and thence to said discharge passages.

4. A dynamo electric machine having a rotor and a stator, the latter comprising a stator core and a stator housing, including end housings forming air chambers at opposite ends of the stator and rotor, the machine having air discharge passages circumferentially distributed about the stator between the end air chambers but communicating therewith, an air circulation device comprising fan blades driven by one end of the rotor, the adjacent housing having an air admission opening, an air deflector arranged centrally with relation to the fan blades for directing the air admitted through said opening to within the path of the fan blades, and a by-pass arranged externally the stator and connecting the end air chambers, whereby cooling air is caused to enter at one end of the stator housing and pass in part directly therethrough to said discharge passages and in part to the opposite end of the stator housing through said by-pass and thence to said discharge passages.

5. A dynamo electric machine having a rotor and a stator, the latter comprising a stator core and a stator housing, including end housings forming air chambers at opposite ends of the stator, the machine having air discharge passages circumferentially distributed about the stator between the end air chambers but communicating therewith, the machine being supported by the housing at one end, a by-pass arranged externally the stator and connecting the end air chambers, the said supporting housing being otherwise closed to the admission of external air, an air admission opening in the opposite housing, an air circulation device comprising fan blades driven by the end of the rotor adjacent said housing, and an air deflector for directing the air admitted through said opening to within the path of the fan blades, whereby cooling air is caused to enter at one end of the stator housing and pass in part directly therethrough to said discharge passages and in part to the opposite end of the stator housing through said by-pass and thence to said discharge passages.

6. A dynamo electric machine having a rotor and a stator, the latter comprising a stator core and a stator housing, including end housings forming air chambers at opposite ends of the stator and rotor, the machine being provided with air passages circumferentially distributed about the stator between the end air chambers but communicating therewith and the rotor shaft having a bearing at one end only of the machine, an air circulation device comprising fan blades driven by the rotor at the opposite end of the machine, the housing adjacent said fan blades having an air opening, an air deflector associated with said housing and said opening and arranged centrally with relation to said fan blades for directing the air to within the path thereof, and a by-pass arranged externally the stator and connecting the end air chambers, whereby cooling air is caused to pass in part directly between said circumferentially arranged passages and said air admission opening and in part between said circumferentially arranged air discharge passages and said air opening through said by-pass.

7. A dynamo electric machine having a rotor and a stator, the latter comprising a stator core and a stator housing, including end housings forming air chambers at opposite ends of the stator and rotor, the machine being provided with air passages circumferentially distributed about the stator between the end air chambers but communicating therewith, an air circulation device comprising fan blades driven by one end of the rotor, the adjacent housing having an air opening, an air deflector associated with said housing and said opening and arranged centrally with relation to said fan blades for directing the air to within the path thereof, and a by-pass arranged externally the stator and connecting the end air chambers, whereby cooling air is caused to pass in part directly between said circumferentially arranged passages and said air admission opening and in part between said circumferentially arranged air passages and said air opening through said by-pass.

In testimony whereof, I have signed my name to this specification.

JOHN B. WIARD.